(12) United States Patent
Kuehne

(10) Patent No.: US 9,727,347 B2
(45) Date of Patent: Aug. 8, 2017

(54) METHOD AND DEVICE FOR PROVIDING A SELECTION POSSIBILITY WHILE PRODUCING DISPLAY CONTENT

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/118,306

(22) PCT Filed: Mar. 13, 2015

(86) PCT No.: PCT/EP2015/000567
§ 371 (c)(1),
(2) Date: Aug. 11, 2016

(87) PCT Pub. No.: WO2015/144294
PCT Pub. Date: Oct. 1, 2015

(65) Prior Publication Data
US 2017/0132017 A1 May 11, 2017

(30) Foreign Application Priority Data
Mar. 22, 2014 (DE) ........................ 10 2014 004 177

(51) Int. Cl.
*G06F 3/00* (2006.01)
*G06F 9/44* (2006.01)
(Continued)

(52) U.S. Cl.
CPC ............ *G06F 9/4443* (2013.01); *G06F 3/013* (2013.01); *G06F 3/0482* (2013.01); *G06F 3/04842* (2013.01); *G06F 3/0488* (2013.01)

(58) Field of Classification Search
CPC ......... H04L 67/04; H04L 67/02; H05L 67/12; G06F 3/0481
See application file for complete search history.

(56) References Cited

U.S. PATENT DOCUMENTS 6,133,914 A 10/2000 Rogers et al.
2012/0017182 A1 1/2012 Bau
(Continued)

FOREIGN PATENT DOCUMENTS

DE 100 30 765 A1 1/2002
DE 101 24 237 A1 12/2002
(Continued)

OTHER PUBLICATIONS

DE 102008057045 A1 Pub English translation. DE102008057045.pdf 6 pages.*
(Continued)

*Primary Examiner* — Haoshian Shih
(74) *Attorney, Agent, or Firm* — Staas & Halsey LLP

(57) ABSTRACT

During setup of a display content on a display panel of a display apparatus a method for providing a selection option is performed which involves the display of a temporary display content at a temporary position on the display panel, the display content having at least one selection option. In addition, the method involves identification of a selection from at least one of the selection options at the temporary position on the display panel and display of a final display content at a final position on the display panel. Furthermore, there is provision for the selection from at least one of the selection options at the temporary position to be identified as a selection while the final display content is already displayed at the final position on the display panel.

19 Claims, 1 Drawing Sheet

(51) Int. Cl.
    *G06F 3/0482*     (2013.01)
    *G06F 3/01*     (2006.01)
    *G06F 3/0484*     (2013.01)
    *G06F 3/0488*     (2013.01)

(56) References Cited

U.S. PATENT DOCUMENTS

| | | |
|---|---|---|
| 2012/0174121 A1 | 7/2012 | Treat et al. |
| 2012/0240084 A1 | 9/2012 | Polubinski et al. |
| 2013/0093764 A1* | 4/2013 | Andersson ............ G06F 9/4443 |
| | | 345/419 |

FOREIGN PATENT DOCUMENTS

| | | | | |
|---|---|---|---|---|
| DE | 695 26 880 T2 | | 1/2003 | |
| DE | 10 2006 014 666 A1 | | 10/2006 | |
| DE | 102008057045 | * | 5/2010 | ............ H04L 67/04 |
| DE | 10 2009 015 350 A1 | | 9/2010 | |
| DE | 10 2014 004 177.8 | | 3/2014 | |
| EP | 2 538 347 A1 | | 12/2012 | |
| EP | 2 584 445 A1 | | 4/2013 | |
| EP | PCT/EP2015/000567 | | 3/2015 | |

OTHER PUBLICATIONS

International Search Report dated Jul. 21, 2015 from International Patent Application No. PCT/EP2015/000567, 2 pages.
German Office Action dated Jun. 16, 2015 from German Patent Application No. 10 2014 004 177.8, 5 pages.
English translation of the International Preliminary Report on Patentability dated Oct. 13, 2016 from International Patent Application No. PCT/EP2015/000567, 9 pages.

* cited by examiner

METHOD AND DEVICE FOR PROVIDING A SELECTION POSSIBILITY WHILE PRODUCING DISPLAY CONTENT

CROSS REFERENCE TO RELATED APPLICATIONS

This application is a U.S. national stage of International Application No. PCT/EP2015/000567, filed on Mar. 13, 2015. The International Application claims the priority benefit of German Application No. 10 2014 004 177.8 filed on Mar. 22, 2014. Both the International Application and German Application are incorporated by reference herein in their entirety.

BACKGROUND

Described herein are a method and an apparatus for providing a selection option during setup of a display content on a display panel of a display apparatus and to a display apparatus. In addition, described herein is a vehicle having an installed display apparatus.

During operator control of touch-sensitive interfaces on screen surfaces, also called touch-based interfaces, inadvertent initiation of a selection on the basis of screen contents, particularly connections, for example in the form of a link, is frequently unreliable. This is the case particularly when a screen surface is currently being set up that changes within a short period of time, so that between a decision by a user to initiate a function and the actual touching of the touch-sensitive interface, the screen content has changed in the interim. This causes inappropriate initiation, since the user touches the location on the screen surface at which he saw the connection, while the latter is positioned at a different location on the screen surface. If there is another connection at the position that the user nevertheless touches, then the connection is selected unintentionally. If the connection is a link, then, by way of example, an internet page is called that has not been intentionally selected by the user. In other words, when a user wishes to activate a link during active setup or during loading of an internet page, difficulties can arise if the link yet changes its position on the screen surface as a result of a setup process and a finger of the user performs the operator control at the position of the link that existed at first.

If there is no further link at this first position in the interim, then a function is not initiated, which would be the best case. However, it may also be that there is now another link at the position of the original link, which is activated by the user, even though the user intended to select the link that was displayed at this position previously. Therefore, an unwanted link is selected unintentionally.

EP 2 538 347 A1 describes a data processing apparatus for electronically processing data that has a touch-sensitive panel. The touch-sensitive panel can be used to control inputs and reproduction of connections on a graphical user interface. In this context, it is possible for selectable list entries to be presented on the touch-sensitive panel. In the event of a touch on the touch-sensitive panel by a user remaining, the information-representing data that are linked to a current list entry are displayed, with provision being able to be made for delayed execution of the display.

Delaying the display may be a solution to the aforementioned problem. However, this option additionally delays further page setup for the screen display, which is undesirable, since the content should be displayed completely as quickly as possible.

SUMMARY

Therefore, according to the method for providing a selection option during setup of a display content described herein, a user may be able to make a safe selection of a display content when a display is being set up, without the process of page setup being delayed thereby.

The method involves display of a temporary display content at a temporary position on the display panel, wherein the display content has at least one selection option. In addition, the method involves identification of a selection from at least one of the selection options at the temporary position on the display panel and display of a final display content at a final position on the display panel. Furthermore, there is provision for the selection from at least one of the selection options at the temporary position to be identified as a selection while the final display content is already displayed at the final position on the display panel.

At the temporary position, contents that require few memory and transmission reserves are displayed, for example. Contents such as graphics, for example, are first displayed at the final position. Accordingly, it is possible for a selection already to be made by touching the screen surface or display surface even though the complete content of the screen display is not yet displayed. A sudden change of position between temporary position and final position arises as a result of further contents that were not yet present in the temporary position being displayed in the final position. Although a sudden change of position takes place, a selection can be made safely, since the temporarily displayed content can be selected at the position at which it appeared at first, even though image setup advances further and the previously displayed content is already displayed at a final position. This means that when there is a sudden change of position for the selection option during screen setup or display setup, inappropriate initiation is avoided while, at the same time, image setup does not have its timing delayed.

In this case, the display panel may be a physically present display panel, such as, by way of example, a screen surface on a computer or a mobile appliance such as a notebook or a Smartphone. It is also possible for the display panel to be a virtual display panel that is obtained by using a projection, for example, and is visible to a user freely in space without the need for physical provision of a panel. Embodiments are also possible in which the panel is physically or virtually curved. In addition, three-dimensional geometries may also be visible in the panel, so that selection options in the form of three-dimensional operator control elements are visible, for example.

In addition, it is also possible for the display content to have a multiplicity of selection options that is displayed as a selection list on the panel. In this case, the selection options are provided in the form of a list, for example, such as a link list that provides a link to each of further display contents. This may be a connection list or link list, each link being able to set up a connection to a predetermined web page on the internet, for example. All in all, it is possible to prevent a user from activating an erroneous link as a result of a sudden change of position for one or more selection options.

In addition, there may be provision for the selection option to be a connection that, when touched, prompts further display contents to be displayed. Such a connection is a link for selecting an internet page or a selection button for controlling an appliance or device for example.

Advantageously, there may be provision for the selection at the temporary position within a predetermined period of time to be identified as selection of the selection option. This predetermined period of time has the advantage that inappropriate initiation can be prevented at least within a particular reaction time of a user.

Advantageously, the predetermined period of time is between 0.5 and 1.0 second. For example, there may be provision for a predetermined period of time of 0.8 second. Hence, there is provision for an interval of time or a timing delay of between 0.5 and 1.0 second between the display of the display content at the temporary position and the identification of the selection at the temporary position.

In an embodiment, there may be provision for the selection to be made by a touch on the panel. By way of example, such a selection is possible when a touch-sensitive display apparatus is used.

In an embodiment, there may be provision for the selection to be made contactlessly. In this case, techniques such as what is known as "eye tracking", for example, are used.

In addition, the method may be performed using a display apparatus having a display content that is set up over time. In this case, the display apparatus has a display panel for displaying the display content and a control unit for identifying a selection on the display panel. In addition, there is provision for a temporary display content to be displayable at a temporary position on the display panel, wherein the display content has at least one selection option. Furthermore, there is provision for the control unit to render a selection from at least one of the selection options identifiable, wherein a final display content is displayable at a final position on the display panel. Furthermore, there is provision for the control unit to render a selection of at least one of the selection options at the temporary position identifiable as the selection while the final display content is already displayed at the final position on the display panel.

In an embodiment, there may be provision for the display apparatus to be a touch-sensitive display apparatus. The touch-sensitive display apparatus used may be a resistive-action display apparatus or a display. It is also advantageously possible to use a capacitive-action display apparatuses or a display. In this case, a touch on the display panel of the display apparatus is identified by monitoring a resistor or a capacitance. These display apparatuses or displays can have a capacitive or resistive sensor system. An evaluation can occur in a system-individual controller or a control unit, as part of a mobile terminal or a mobile device. In addition, it is also possible for an evaluation to take place within a more complex system that is at a fixed location or not tied to a location. It is therefore also possible for an evaluation of a selection and subsequent provision of the selected contents to be provided by using a cloud solution. In this case, a control unit may be in the form of a cloud process unit, for example.

In an embodiment, there may be provision for the display apparatus to be a projection apparatus. Such a projection apparatus provides a projection as a display panel, which is not limited in spatial terms and can therefore have its display panel matched very flexibly to the surroundings. By way of example, a projection can also be provided by using goggles that a user wears during a selection, or the like.

In addition, it is possible for the selection to be made contactlessly. In this case, techniques such as what is known as "eye tracking", for example, are used. An embodiment provides for the selection to be rendered possible using a camera-based eye tracking system. By way of example, this occurs by virtue of a user staring at a selection object or a selection panel. A new display is then overlaid on the first display or projection. Beforehand, the previously visible selection point is activated, provided that the selection confirmation has occurred in a predetermined period of time and inappropriate initiation can be assumed, i.e. initiation that would activate an unwanted selection.

In addition, the method described herein may be implemented by a vehicle that is equipped with an installed display apparatus, wherein the display panel is part of an information system in the vehicle, for example. The touch-sensitive user interface may be part of a navigation appliance (device), part of an audio system or a combination thereof, for example.

All in all, the method described herein provides improved operator control, particularly touch control or contactless control, in which stable interaction is ensured when using contents that are being set up. The display surface may be part of a permanently installed apparatus, such as, by way of example, a computer or a part of an information system for tourists at an attraction or a mobile terminal, such as a notebook, a Smartphone or goggles, for example. The opportunities for using a method and the user interface are manifold.

It should be pointed out that the features described herein can be used for an apparatus and for a method as appropriate and can be combined with one another arbitrarily.

BRIEF DESCRIPTION OF THE DRAWINGS

These and other aspects and advantages will become more apparent and more readily appreciated from the following description of the exemplary embodiments, taken in conjunction with the accompanying drawings, of which.

DETAILED DESCRIPTION OF THE PREFERRED EMBODIMENT

Figure 1:
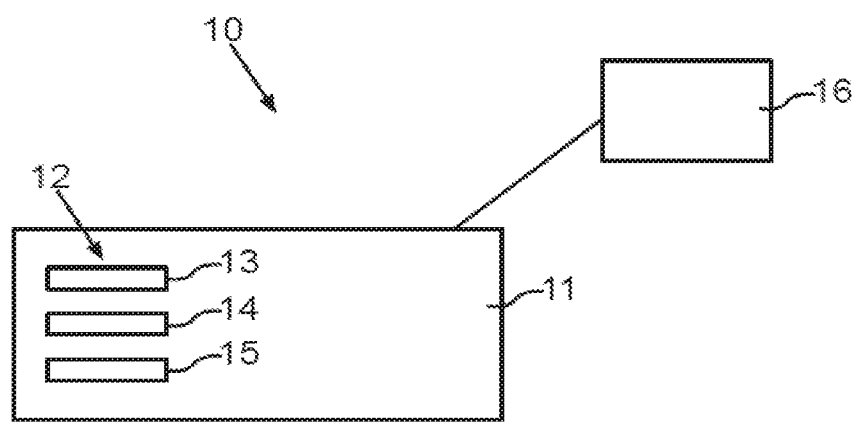
FIG. 1 is a block diagram of a display apparatus with at display content at a first time.

Reference will now be made in detail to the preferred embodiments, examples of which are illustrated in the accompanying drawings, wherein like reference numerals refer to like elements throughout.

In the drawings, FIG. 1 schematically shows a display apparatus 10 having a display panel 11 that has a display content with selection options 12 in the form of connections at a first position at a first time. The selection options 12 are provided as connections 13, 14, 15, each of the connections 13, 14, 15 being a link that, when selected, leads to further contents being presented. The list of connections 12 or the link collection 12 is displayed at a first position on the display surface 11 of the display apparatus 10 at first. This happens in the left-hand region of the display surface 11 in FIG. 1. In addition, the display apparatus 10 has a control unit 16 that controls the content and the position of the link collection 12 and at the same time monitors possible operator control of the display panel by identifying a selection.

Figure 2:
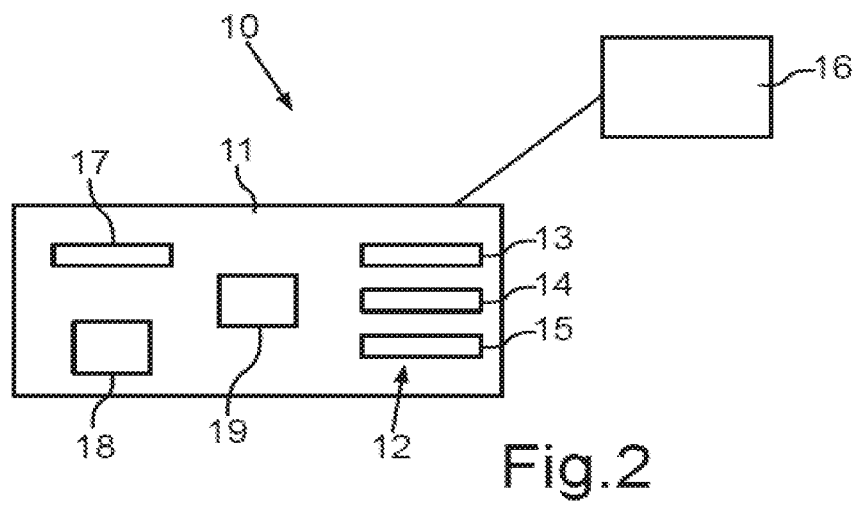
FIG. 2 is a block diagram of the display apparatus of FIG. 1 with a display content at a second time.

FIG. 2 shows the display apparatus 10 of FIG. 1 with a display content at a second position at a second time, which is obtained following the conclusion of display setup. The display content additionally has the link collection 12, a further link 17 and additionally graphics 18, 19, which have been loaded in the interim by using the control unit 14 and are now displayed on the display panel 11. In the interim, the position of the link collection 12 has also changed, the position having adopted a temporary position in FIG. 1 and being present at its final position in FIG. 2. Therefore, the position of the selection options 12 or of the link collection 12 is displaced while a user can perform operator control.

By way of example, the user selects the top link 13 in FIG. 1 as a selection option, the selection being identified by the control unit 16 by recognition of the display panel being touched or through contactless eye tracking. In the case of eye tracking, the control unit is additionally connected to a camera that is in the form of an infrared camera, for example, and points in the direction of the eyes of the user. In this case, the camera evaluates the eye movements of the user, for example by comparing the line of vision of the two eyes on the basis of generated vectors. The eye movement or a determined line of vision allows a selection to be made contactlessly by using the eyes. This selection can then be confirmed if need be using a further device, for example a physical key on a keypad or selection button, for example in a vehicle. In addition, the control unit 16 may be connected to the display apparatus 10 by using a radio interface, so that the control unit 16 is in the form of a cloud process unit and is part of a cloud technology.

While the control unit 16 continues to set up the display content on the display panel 11, the user makes a selection at the temporary position, as shown in FIG. 1, even though the link collection 12 is already at its final position, as shown in FIG. 2. Nevertheless, the control unit 16 takes account of the display content that it had displayed in the temporary position beforehand for the selection by the user. Hence, the user selects a link 13 in its temporary position, as shown in FIG. 1, even though the display apparatus 10 already presents the selected link 13 at its final position, as shown in FIG. 2. As a result of the activation of the link 13, the control unit 16 produces a new content on the display panel 11 that corresponds to the desired content of the selected link 13. This makes it possible to prevent inappropriate initiation of the link 17 that is now present at the position of the link 13 displayed beforehand. Although the user touches the link 17 during the selection, the content of the link 13 is displayed finally. Incorrect initiation is prevented by virtue of a predetermined period of time for activating the link 13.

All in all, more stable interaction when using contents that are being set up, such as internet pages, is achieved by ascertaining the time between image setup and selection or a tap. The number of inappropriate initiations is reduced by taking account of a time delay between the selection of a selection option and the evaluation of the selection. In this case, the display content is set up from a temporary position to a final position without the setup process having its timing delayed.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for providing a selection option during setup of a display content on a display panel of a display apparatus, the method comprising:
    displaying a temporary display content at a temporary position on the display panel, the temporary display content having at least one selection option;
    identifying a selection from at least one of the at least one selection option at the temporary position on the display panel while a final display content is currently displayed at a final position on the display panel; and
    displaying the final display content at the final position on the display panel.

2. The method as claimed in claim 1, wherein the at least one selection option includes a link that, when selected, prompts further display contents to be displayed.

3. The method as claimed in claim 1, wherein the selection from the at least one of the at least one selection option at the temporary position is identified if the selection occurs within a predetermined period of time after the display of the temporary display content at the temporary position.

4. The method as claimed in claim 3, wherein the predetermined period of time is between 0.5 and 1.0 second.

5. The method as claimed in claim 4, wherein the predetermined period is 0.8 second.

6. The method as claimed in claim 1, wherein the selection is made by a touch on the display panel.

7. The method as claimed in claim 1, wherein the selection is made without contacting the display apparatus.

8. The method as claimed in claim 7, wherein the selection is made by tracking an eye of a user.

9. The method as claimed in claim 1, wherein the final display content includes the at least one selection option which is displayed at the final position on the display panel.

10. A display apparatus having a display content that is set up over time, the display apparatus comprising:
    a display panel configured to display the display content which includes at least one selection option; and
    a controller configured to:
        identify a selection on the display panel of the at least one selection option,
        control the display panel to display a temporary display content at a temporary position on the display panel,
        determine a selection from at least one of the at least one selection option at the temporary position on the display panel identifiable as the selection while a final display content is currently displayed at a final position on the display panel, and
        control the display panel to display the final display content at the final position on the display panel.

11. The display apparatus as claimed in claim 10, wherein the display apparatus is a touch-sensitive display apparatus.

12. The display apparatus as claimed in claim 10, wherein the display apparatus is a projection apparatus.

13. The display apparatus as claimed in claim 10, wherein the final display content includes the at least one selection option which is displayed at the final position on the display panel.

14. A vehicle, comprising:
    a chassis;
    at least one vehicle system;
    at least one information system configured to control the at least one vehicle system; and
    a display apparatus configured to control the at least one information system and having a display content that is set up over time, the display apparatus including:
        a display panel configured to display the display content which includes at least one selection option; and
        a controller configured to:
            identify a selection on the display panel of the at least one selection option,
            control the display panel to display a temporary display content at a temporary position on the display panel, determine a selection from at least one of the at least one selection option at the temporary position on the display panel identifiable as the selection while a final display content is currently displayed at a final position on the display panel, and control the display panel to display the final display content at the final position on the display panel.

15. The vehicle as claimed in claim 14, wherein the at least one vehicle system includes at least one of a navigation system and an entertainment system.

16. The vehicle as claimed in claim 14, wherein the display panel is touch-sensitive and configured to detect the selection of the at least one selection option.

17. The vehicle as claimed in claim 14, wherein the final display content includes the at least one selection option which is displayed at the final position on the display panel.

18. The vehicle as claimed in claim 14, wherein the final display content includes at least one additional selection option and a graphic not included in the temporary display content.

19. The vehicle as claimed in claim 14, wherein the final position of the at least one selection option on the display panel is different from the temporary position of the at least one selection option on the display panel.

* * * * *